United States Patent
Gehris

(10) Patent No.: US 10,463,994 B2
(45) Date of Patent: Nov. 5, 2019

(54) DIFFUSIOPHORETIC WATER FILTRATION DEVICE WITH OPENABLE CLOSED CHANNEL STRUCTURE

(71) Applicant: Split Rock Filter Systems LLC, New Paltz, NY (US)

(72) Inventor: William Christian Gehris, New Paltz, NY (US)

(73) Assignee: Split Rock Filter Systems LLC, New Paltz, NY (US)

( * ) Notice: Subject to any disclaimer, the term of this patent is extended or adjusted under 35 U.S.C. 154(b) by 0 days.

(21) Appl. No.: 16/182,579

(22) Filed: Nov. 6, 2018

(65) Prior Publication Data

US 2019/0151777 A1    May 23, 2019

Related U.S. Application Data

(63) Continuation of application No. 15/861,273, filed on Jan. 3, 2018, now Pat. No. 10,155,182.

(60) Provisional application No. 62/587,510, filed on Nov. 17, 2017.

(51) Int. Cl.

| | | |
|---|---|---|
| *B01D 63/08* | (2006.01) | |
| *B01D 24/30* | (2006.01) | |
| *B01D 39/02* | (2006.01) | |
| *B01D 65/02* | (2006.01) | |
| *B01D 71/70* | (2006.01) | |

(Continued)

(52) U.S. Cl.
CPC ............. *B01D 24/30* (2013.01); *B01D 39/02* (2013.01); *B01D 65/025* (2013.01); *B01D 69/02* (2013.01); *B01D 71/70* (2013.01); *B01J 8/005* (2013.01); *B01D 2239/1241* (2013.01)

(58) Field of Classification Search
CPC ........ B01D 24/30; B01D 71/70; B01D 39/02; B01D 69/02; B01D 65/02; B01D 63/08–088; B01D 57/02; B01D 47/02; B01D 2259/12; B01J 8/00
See application file for complete search history.

(56) References Cited

U.S. PATENT DOCUMENTS

| | | |
|---|---|---|
| 5,496,472 A | 3/1996 | Slack et al. |
| 6,908,547 B2 | 6/2005 | Cote et al. |
| 9,932,251 B2 | 4/2018 | Crooks et al. |

(Continued)

FOREIGN PATENT DOCUMENTS

| | | |
|---|---|---|
| CA | 2909003 A1 | 4/2017 |
| CN | 103807457 | 5/2014 |

(Continued)

OTHER PUBLICATIONS

Lee et al., Synthesis and Properties of Waterborne Poly(urethane urea)s Containing Polydimethylsiloxane, Journal of Applied Polymer Science, vol. 120, 212-219 (2011). (Year: 2011).*

(Continued)

*Primary Examiner* — Pranav N Patel

(57) ABSTRACT

A diffusiophoretic water filtration device includes a diffusiophoretic flow chamber having an inlet and an outlet, the flow chamber for receiving the colloidal suspension at the inlet from the inlet manifold, and passing the colloidal suspension between the inlet and at least one outlet in a flow direction; the flow chamber having a removable and reassemblable cover defining a boundary of the diffusiophoretic flow chamber.

30 Claims, 8 Drawing Sheets

(51) Int. Cl.
*B01J 8/00* (2006.01)
*B01D 69/02* (2006.01)

(56) References Cited

U.S. PATENT DOCUMENTS

| | | |
|---|---|---|
| 2003/0121841 A1 | 7/2003 | Harttig et al. |
| 2007/0138082 A1* | 6/2007 | Connors, Jr. ........ B01D 63/082 210/321.84 |
| 2009/0234332 A1* | 9/2009 | Borenstein ............ A61M 37/00 604/891.1 |
| 2011/0198225 A1 | 8/2011 | Kim et al. |
| 2015/0353376 A1 | 12/2015 | Hanover |
| 2016/0375407 A1 | 12/2016 | Velegol |
| 2018/0201525 A1 | 7/2018 | Crooks et al. |
| 2018/0257054 A1 | 9/2018 | Shardt et al. |
| 2019/0151776 A1 | 5/2019 | Gehris |

FOREIGN PATENT DOCUMENTS

| | | |
|---|---|---|
| WO | WO 2015/077674 A1 | 5/2015 |
| WO | WO 2018048735 A1 | 3/2018 |

OTHER PUBLICATIONS

"Membraneless water filtration using CO2" by Shin et al. (Nature Communications 8:15181), May 2, 2017.
"Diffusiophoresis at the macroscale" by Mauger et al. (arXiv: 1512.05005v4), Jul. 6, 2016.
"Origins of concentration gradients for diffusiophoresis" by Velegol et al, (10.1039/c6sm00052e), pp. 4686 to 4703, May 13, 2016.
"Reverse Osmosis Pretreatment," downloaded on Jan. 14, 2018 from https://www.lenntech.com/ro/ro-pretreatment.htm, Jan. 4, 2008.
"Ultrafiltration" downloaded on Jan. 14, 2018 from https://www.lenntech.com/library/ultrafiltration/ultrafiltration.htm, Mar. 11, 2008.
Isaias:"Experience in reverse osmosis pretreatment," Desalination 139 (2001), 57-64, received Feb. 2, 2001.
Brunelle et al:"Colloidal Fouling of Reverse Osmosis Membranes," Desalination 32 (1980) 127-135, Jan. 1980.
U.S. Appl. No. 16/283,716, filed Nov. 2, 2018, not yet published.
U.S. Appl. No. 16/179,854, filed Nov. 2, 2018, published as U.S. 2019/015176A1.
U.S. Appl. No. 16/283,716, filed Nov. 2, 2018.

* cited by examiner

DIFFUSIOPHORETIC WATER FILTRATION DEVICE WITH OPENABLE CLOSED CHANNEL STRUCTURE

This application claims priority to U.S. Provisional Patent Application 62/587,510, tiled Nov. 17, 2017, the entirety of which is hereby incorporated by reference herein, and is a continuation of U.S. patent application Ser. No. 15/861,273, filed Jan. 3, 2018, the entirety of which is also hereby incorporated by reference herein. This application relates generally to water filtration and more particularly to a diffusiophoretic water filtration device.

BACKGROUND

The article "Membraneless water filtration using CO2" by Shin et al. (Nature Communications 8:15181), 2 May 2017, hereby incorporated by reference herein, describes a continuous flow particle filtration device in which a colloidal suspension flows through a straight channel in a gas permeable material made of polydimethylsiloxane (PDMS). A CO2 gas channel passes parallel to the wall and dissolves into the flow stream. An air channel on the other side of the wall prevents saturation of CO2 in the suspension and the resulting gradient of CO2 causes particles to concentrate on sides of the channel, with negatively charged particles moving toward the air channel and positively charged particles toward the CO2 channel. The water away from the sides of the channel can be collected as filtered water.

The article "Diffusiophoresis at the macroscale" by Mauger et al. (arXiv: 1512.05005v4), 6 Jul. 2016, hereby incorporated by reference herein, discloses that solute concentration gradients caused by salts such as LiCl impact colloidal transport at lengthscales ranging roughly from the centimeter down to the smallest scales resolved by the article. Particles of a diameter of 200 nm were examined.

The article "Origins of concentration gradients for diffusiophoresis" by Velegol et al, (10.1039/c6sm00052e), pages 4686 to 4703, 13 May 2016, hereby incorporated by reference herein, describes diffusiophoresis possibly occurring in georeservoir extractions, physiological systems, drying operations, laboratory and industrial separations, crystallization operations, membrane processes, and many other situations, often without being recognized.

PCT Publication WO 2015/077674 discloses a process that places a microparticle including a salt in proximity to a membrane such that the microparticle creates a gradient generated spontaneous electric field or a gradient generated spontaneous chemiphoretic field in the solvent proximal to the membrane. This gradient actively draws charged particles, via diffusiophoresis, away from the membrane thereby removing charged particulate matter away from the membrane or preventing its deposition.

SUMMARY OF THE INVENTION

The present invention provides a water filtration device comprising:
- a pressurized gas chamber receiving a pressurized gas;
- an inlet manifold receiving a colloidal suspension including colloidal particles in water;
- a flow chamber having an inlet and an outlet, the flow chamber receiving the colloidal suspension at the inlet from the inlet manifold, the colloidal suspension flowing between the inlet and at least one outlet in a flow direction; and
- a horizontal sheet separating the gas chamber and the flow chamber, the sheet being made of a gas permeable membrane, the gas capable of permeating the membrane, the membrane being water impermeable, the gas being carbon dioxide and permeating the membrane upwardly from the gas chamber in a direction normal to the membrane so as to induce diffusiophoretic motion on at least some of the colloidal particles opposite to or in the direction normal to the membrane, the sheet covering a top of the pressurized gas chamber;
- the flow chamber being a closed flow chamber having an air permeable cover and a channel structure contacting the colloidal suspension, so as to define a thickness between the cover and the horizontal sheet; and
- the at least one outlet having a first outlet spaced above a second outlet, the first outlet for receiving water having a higher concentration of some of the colloidal particles than a second outlet.

The present invention advantageously permits the use of a sheet, such as a PDMS sheet, rather than the complicated channel structure of the prior art. The channel structure, whether provided in one piece with the cover or as a separate structure as described below, can be easily manufactured, and easily placed on the sheet to create a flow chamber. The channel structure also can be removable to provide for easy cleaning, for example by pressurized water.

One preferred PDMS sheet is a PDMS silicone membrane available from Specialty Silicone Products, Inc. of Ballston Spa, N.Y.

A preferred thickness of the sheet may be from 10 micrometers to 250 micrometers, and most preferably from 20 micrometers to 100 micrometers.

The sheet preferably is at least 5 cm wide by 5 cm long, although larger widths and lengths are preferred, preferably at least 1 m wide by 1 m long.

The sheet preferably is unstructured, although open structuring such as ribbing or channels in the length direction is possible.

The sheet preferably has a Shore A of between 40 and 60, and a tensile elongation of at least 1000 psi. The elongation to failure is preferably at least 200%, and most preferably at least 400%, and the tear B is at least 150 ppi.

All of the sheet values, including thickness, are advantageous for manufacture of the present device, as the sheet can be stretched taut for example to provide an excellent flow surface while still providing excellent gas permeability.

Flow velocity through the closed flow chamber can be controlled accurately via the input pressure, for example via a water pressure reducing valve or a water pressure regulator. An inlet manifold thus can provide the colloidal suspension at a defined and variable pressure to the inlet of the flow chamber, and thus also can contain a water pressure regulator. The pressure for example can be set at a defined pressure, for example via height regulation or a pump. Inlet manifold as defined herein is thus any structure that provides a predefined width for the colloidal suspension to the inlet of the flow chamber.

In one embodiment, the cover may be made in one piece together with a channel structure of longitudinally extending microchannels, each for example of a thickness of 500 micrometers, width of 900 micrometers and extending a meter in length. The cover and channel structure thus may be etched for example via soft lithography into a single piece of PDMS material. A PDMS barrier between the channels in the width direction of 100 micrometers can be provided, so that for a width of 1 m, 1000 microchannels can be provided, if for example the two edge barriers are 50 micrometers wide. The single piece 1 m×1 m cover and channel structure can be laid over the PDMS sheet, which due to the air pressure, presses against the cover from below and forms stable microchannels. This embodiment provides microchannels for excellent fluid velocity control, and is easily detachable and cleanable. The cover for example can be removed and the channels and the PDMS sheet sprayed with high velocity water. The device can then be quickly reassembled. The distance between an outer surface of the cover facing air, and the top of the channel structure can be for example 10 to 25 micrometers.

In a second alternate embodiment, the channel structure is provided separately from the cover, and is sandwiched by the sheet and the cover. In this embodiment, the cover may be similar to the sheet described above, and the channel structure may be for example a rectangle made of PVC or other plastic material with longitudinally extending channels open on the top and bottom to define longitudinally extending holes. The channel structure thus may be for example 500 micrometers thick, and the holes 900 micrometers wide and extending a meter in length. At the front end the structure can be connected so that the inlet is provided by placing a colloidal suspension supply over the holes, and the rear end can have an outlet structure to divide the outlet stream by connecting the holes at a certain height, for example extending in a V-shape to a rear thickness of 25 micrometers between 125 and 150 micrometers.

The separate channel structure also can be removed from the bottom sheet and the cover and cleaned easily.

In both the first and second embodiments, longitudinally extending clamps can be provided at both sides so that the cover and channel structure are clamped with respect to the sheet. A flange on the gas chamber can be used as a counter surface for the clamp, and the clamps can also provide the tautness for the sheet, or this can be provided separately, for example by a reel mechanism.

In both the first and second embodiments, alternate channel structures can be provided, for example depending on the type of colloidal suspension being filtered. Thinner channels structures down to for example 20 micrometer thickness or less could be provided if the colloidal particles and other particles to be removed were sufficiently small. Also wider channels of 10000 micrometers (1 cm) or larger are possible, which can make fouling with non-colloidal particles less likely.

The structure of both the first and second embodiments allows for easy swapping of various channel structures, by providing in the first embodiment a different one piece cover and channel structure, and in the second embodiment by providing a different channel structure.

The pressurized gas preferably can be carbon dioxide, preferably pressurized to at least 120 kPa and most preferably to at least 130 kPa, preferably between 130 kPa and 200 kPa. As the channel thickness increases higher pressures may be desirable to create stronger pressure gradients.

The at least one outlet advantageously can include a movable splitter for altering the size of the first outlet. For example, the first outlet may be located next to the sheet, and the splitter may be spaced from the sheet, and movable to alter a distance between the splitter and the sheet, so that a size of the first outlet is altered. Preferably, as the first outlet increases in size the second outlet decreases in size and vice versa.

The first outlet size may be altered as a function of the particles in the water exiting through the at least one outlet, for example an efficiency of the filtration. For example, if the amount of certain colloidal particles in the water in the second outlet exceeds a certain threshold, the first outlet size can be increased.

Another advantage of the present invention is that while the colloidal particles are in suspension and will not move downwardly on their own due to gravity, it is supposed that as the colloidal particles congregate and move downwardly due to diffusiophoresis, they may be aided by gravity. The horizontal configuration also has advantages in simplified outlet construction, as water can be removed easily through the first outlet with the aid of gravity. In addition, since non-colloidal larger particles can also be filtered, the gravity can aid in the movement of these particles. Thus, the filter of the present invention can be used as a sedimentation aid for non-colloidal particles as well.

While the present application claims a specific structure, other inventive concepts that may be broader than the present claims, such as a diffusiophoretic water filtration device with a flow chamber separable into at least parts, to provide for easy cleaning, a diffusiophoretic water filtration device with a clamped flow chamber, and a diffusiophoretic water filtration device with a variable outlet, a diffusiophoretic water filtration device for filtering noncolloidal particles of larger sizes as well as methods for constructing, operating and cleaning a diffusiophoretic water filtration device, are contained herein, and may be claimed in further continuing applications. Moreover, several features claimed, including the horizontal orientation of the device, type of gas, and thickness of the flow chamber, are advantageous, but may not be necessary to a broader inventive concept that may be claimed in further continuing applications.

The present invention thus provides for example a diffusiophoretic water filtration device comprising: a diffusiophoretic flow chamber having an inlet and an outlet, the flow chamber for receiving the colloidal suspension at the inlet from the inlet manifold, and passing the colloidal suspension between the inlet and at least one outlet in a flow direction; the flow chamber having a removable cover defining a boundary of the diffusiophoretic flow chamber.

The present invention thus also provides a method for cleaning the water filtration device comprising removing the cover and spraying the diffusiophoretic flow chamber with water.

BRIEF DESCRIPTION OF THE DRAWINGS

One schematic embodiment of the water filtration system of the present invention is shown by reference to.

DETAILED DESCRIPTION OF AN EMBODIMENT

Figure 1:
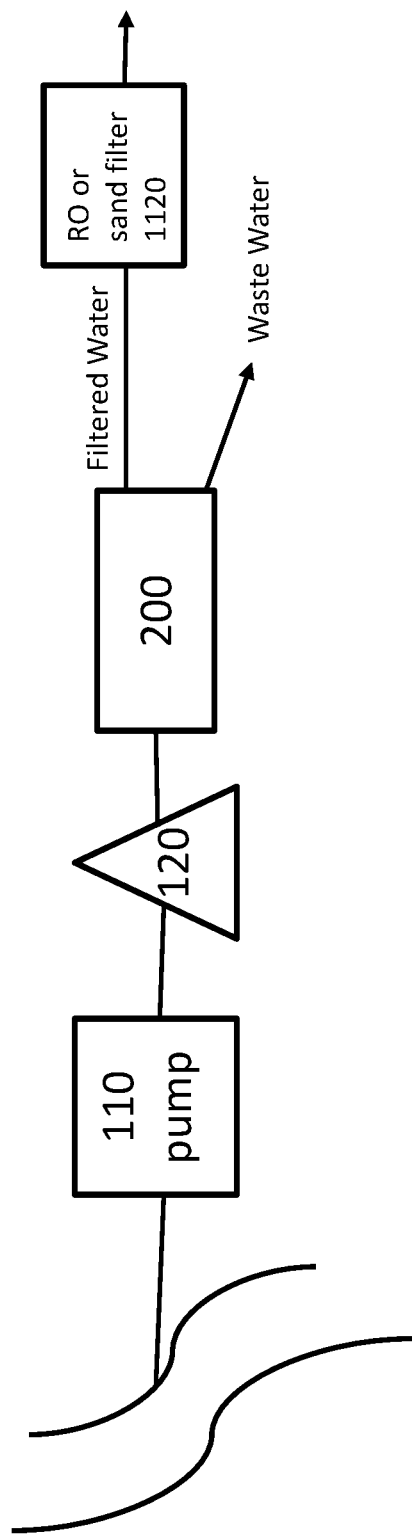
FIG. 1, which shows a schematic view of the system.

FIG. 1 shows a water filtration system 100 for cleaning river water, which may contain various particles such as colloidal plastic or metallic particles, and other bioparticles such as bacteria and viruses. Many of these particles are charged negatively or positively. Any type of water with charged colloidal particles may be filtered using the present invention. "Colloidal particle" as defined herein is any particle that can form a colloid or colloidal suspension in water. Such colloidal particles typically range in sizes of a micrometer or less, but larger sizes are possible. The present invention is not limited to filtering colloidal particles, but can also be used to filter larger particles that are impacted by diffusiophoresis, for example even up to 100 nanometers in size or larger, from water. Preferably the particles to be filtered are less than 250 nanometers in size, even if not colloidal. These non-colloidal particles can have very low sedimentation rates, and thus the present invention can aid in "sedimentation" or forcing these larger particles downwardly.

Water filtration system 100 includes a pump 110 pumping water from a river. The pump 110 pumps the water through a sand filter 120 to remove larger particles and impurities. The water with suspended colloidal particles, i.e. a colloidal suspension, then passes to the water filtration device 200 of the present invention.

Water filtration device 200 is designed to remove positively charged colloid particles and other particles, the removal of which can significantly increase the water quality.

Figure 2:
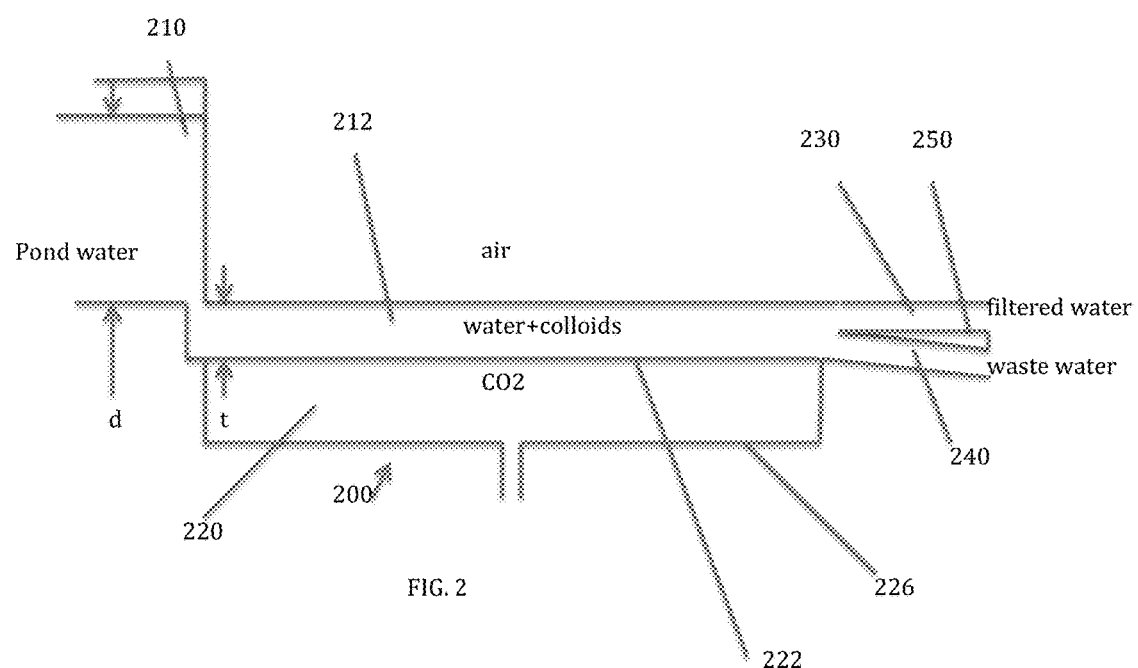
FIG. 2, which shows an embodiment of the water filtration device of the present invention schematically.

Water filtration device 200, shown in FIG. 2 schematically, has an inlet manifold 210 receiving pond water with colloidal particles, preferably having passed through a preliminary filter or sedimentation device, such as sand filter 120. However, water filtration device 200 could be upstream of sand filter 120, thereby removing bacteria and other particles that can foul a downstream R/O or sand filter 1120. Separate water filtration devices 200 could also be both upstream and downstream of sand filter 120.

Inlet manifold 210 spreads the water with colloidal particles in the widthwise direction (into the page in FIG. 2) from a pipe received from sand filter 120. In this example the water with colloidal particles is spread in the inlet manifold to a width of 1 m, and is maintained at a depth d of 1 cm, which height thus regulates the pressure of the suspension that flows into a flow chamber 212. Larger heights can provide larger pressures, and thus faster velocities through the flow chamber 212. The height or a pump can also be used to set the input pressure to a setpoint, for example 1 mbar.

A pressurized gas chamber 220 receives a pressurized gas, such as carbon dioxide, from for example pressurized canisters or an industrial source. Gas chamber 220 has gas tight walls 226, over which sheet 222 can be stretched taut and fastened to in a gas tight manner, for example with fasteners and a sealant. The pressurized gas thus can exit in a uniform manner through the sheet 222. Sheet 222 thus defines the top of gas chamber 220 and the bottom of flow chamber 212.

The colloidal suspension flows from inlet manifold 210 to flow chamber 212 via an exit. Flow chamber 212 can have water tight sidewalls extending from and sealed with respect to sheet 222, and may have a microfluidic or fluid structure therein as will be described. The colloidal suspension thus flows between inlet manifold 210 and two outlets 230, 240 in a flow direction, and, with the closed flow chamber 212 of the present invention, the sheet 222 preferably is in a horizontal orientation to gain the benefit of any gravitational effects on the colloidal particles as they congregate. Other particles present in the water, for example up to 100 nanometers or larger in the largest dimension, can also be impacted positively by gravitational effects.

However, other orientations, even vertical, are possible especially for microfluidic chamber structures where the input pressure is the primary velocity driver.

The carbon dioxide gas permeates the sheet or membrane 222 in a direction normal to the sheet or membrane 222, the normal direction being vertical in the embodiment shown, so as to induce diffusiophoretic motion on positively charged colloidal particles opposite to the direction normal to the membrane, here toward the sheet 222. Negatively charged colloidal particles can move away from the sheet 222, and possibly be filtered, split or suctioned from the top of the suspension. The removal of negatively charged colloidal particles is optional and not necessary in this embodiment.

Outlet 240 thus has water having a higher concentration of positively charged colloidal and other particles, defined as waste water although it can be re-used or refiltered, than a second outlet 230, which can be defined as having filtered water.

A splitter 250, extending widthwise in a wing-shaped manner with a trailing edge of the wing facing the stream, is moveable upwardly or downwardly in this embodiment, and can alter the dimensions of the outlet 240, and thus outlet 230. This adjustment can be a function of the water quality of the filtered water for example, and provides highly advantageous control of water quality, for example as the sources to be filtered are impacted, for example by rainwater.

The splitter 250 may be keyed for example for rotation about a shaft 401 (FIG. 3), the shaft at one end having a worm gear 402 (FIG. 3) movable for example by a worm driven by a motor and controller. Very fine distance gradations thus can be achieved. In the example show, splitter 250 first can be located at 150 micrometers above the sheet 222 and a bottom of the outlet 240, so that for example 350 micrometers of a 500 micrometer thick stream passes above the splitter. The distance then can be adjusted as a function of the colloidal particle distribution in the thickness direction in the stream, and the front edge of the splitter can rotate so that the distance for example can move from about 100 micrometers above the sheet 222 to about 200 micrometers, for example. Splitting of between 20 percent and 40 percent of a 500 micrometer thick stream thus is possible.

Figure 3:
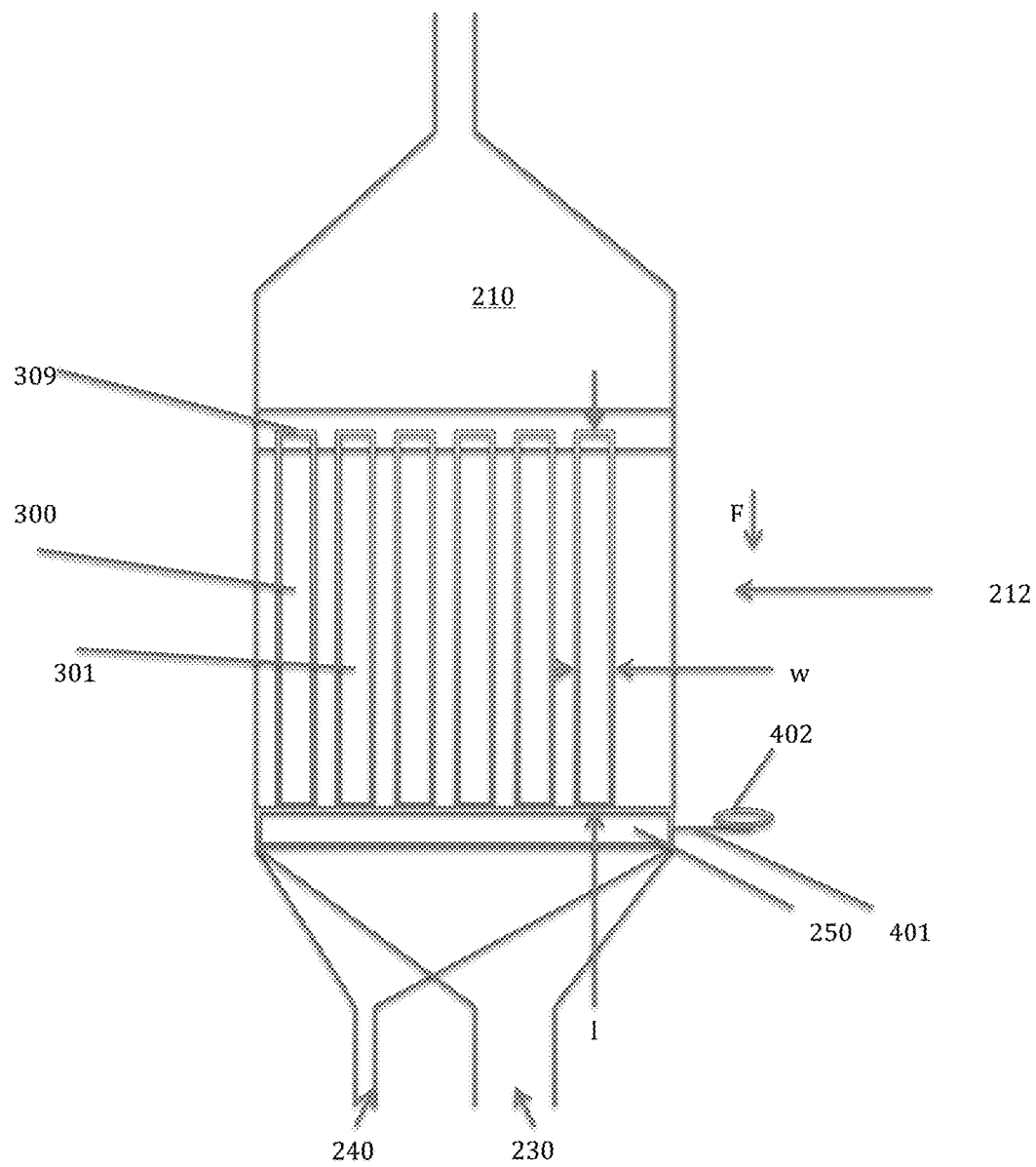
FIG. 3 shows a schematic top view of the water filtration device of FIG. 2.

FIG. 3 shows a schematic top view of the water filtration device of FIG. 2, showing channels 300, 301, which extend a length l in the flow direction F, and a width w in a crosswise direction and have a thickness t (FIG. 2). The exit of inlet manifold 210 extends past front walls 309 of the channels, so the input pressure extant in inlet manifold 210 is transferred to the channels 300, 301. As the depth of the water is typically much larger than the thickness t of the channels 300, 301, the pressure in channels 300, 301 can generally be estimated as the pressure at the exit of the inlet manifold 210.

Figure 4:
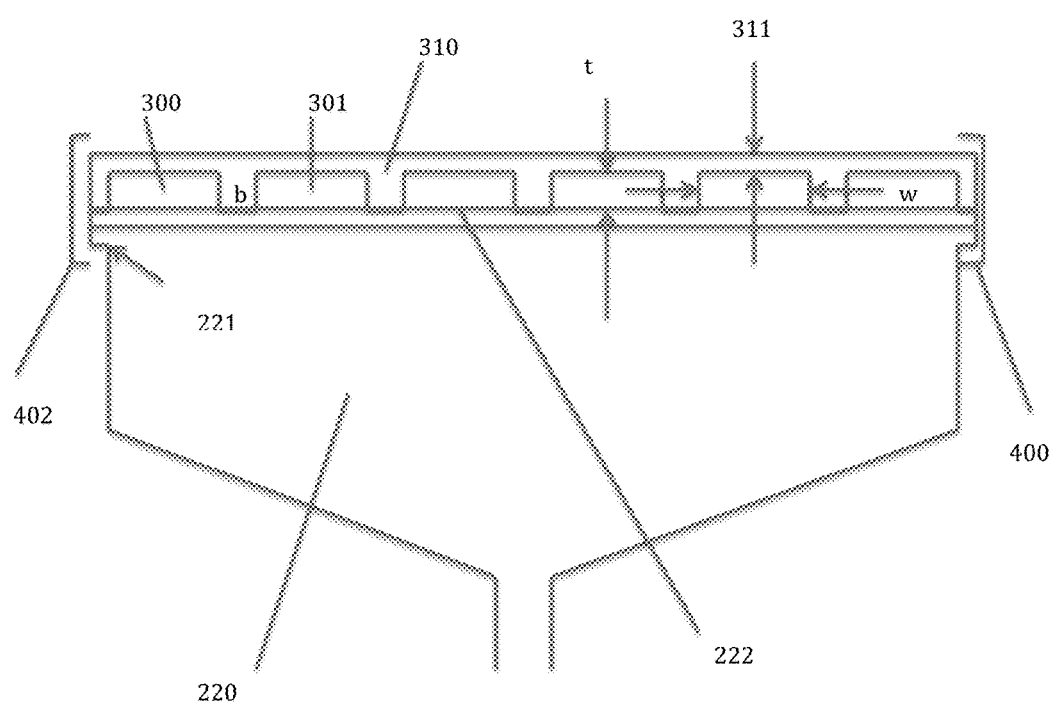
FIG. 4 shows a schematic cross sectional view a first embodiment of a flow chamber including a sheet and one piece cover and channel structure.

FIG. 4 shows a schematic cross sectional view a first embodiment of a flow chamber 212 including a sheet 222 and one piece cover and channel structure 310, having channels 300, 301 therein. Each channel 300, 301 can for example be of a thickness of 500 micrometers, width of 900 micrometers and extending approximately a meter in length. The cover and channel structure 310 thus may be etched for example via soft lithography into a single piece of PDMS material for example. The straight channels however also permit mechanical or laser cutting. A PDMS barrier b between the channels in the width direction of 100 micrometers can be provided, so that for a width of 1 m, 1000 microchannels can be provided, if for example the two edge barriers are 50 micrometers wide. The single piece 1 m×1 m cover and channel structure can be laid over the PDMS sheet 222, which due to the air pressure from gas chamber 220, presses against the cover from below and forms stable microchannels. The gas chamber can be formed for example of metal, and may have longitudinally extending flanges 221 on both lateral sides. Longitudinally extending clamps 400, 402 thus can contact the top of the one piece cover and channel structure 310 and the bottom of the flange 221. Clamps 400, 402 could be for example a two part structure tightenable for example with bolts or screws or made of an elastic material that springs back to provide the clamping action.

The FIG. 4 embodiment provides microchannels for excellent fluid velocity control, and is easily detachable and cleanable. The cover for example can be removed and the channels and the PDMS sheet sprayed with high velocity water. The device can then be quickly reassembled. A distance 311 between an outer surface of the cover facing air, and the top of the channel structure can be for example 10 to 25 micrometers.

Figure 5:
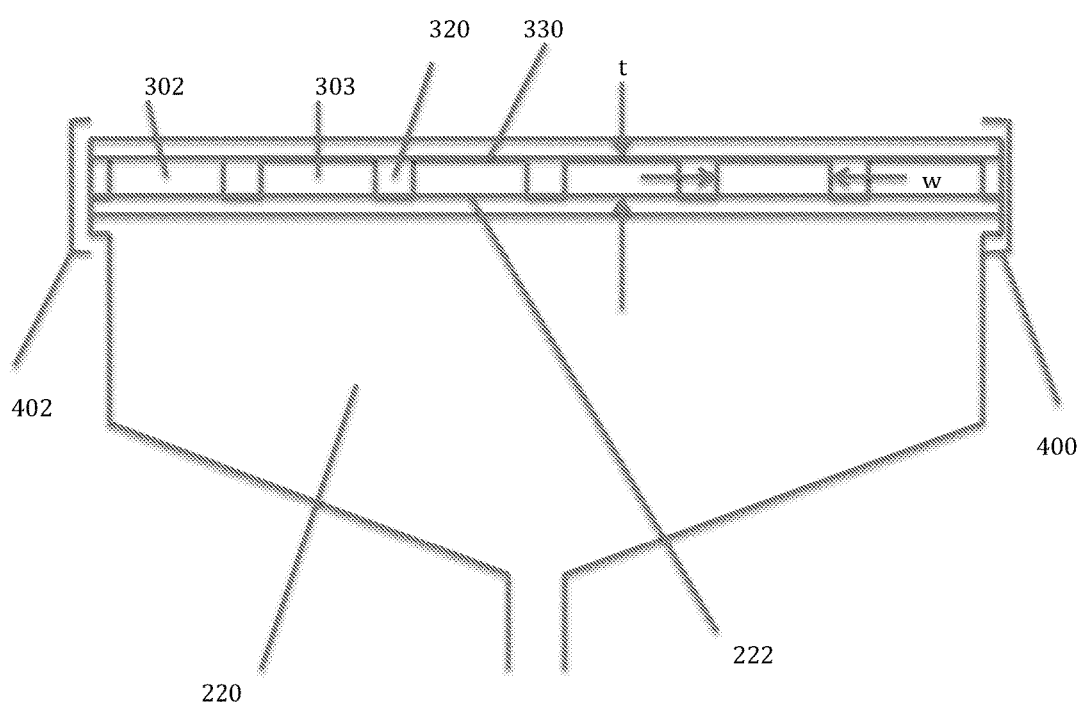
FIG. 5 shows a schematic cross sectional view of a second embodiment with a flow chamber including two sheets and a sandwiched channel structure.

FIG. 5 shows a schematic cross sectional view of a second embodiment with a flow chamber including sheet 222, a cover 330 formed as a second sheet and a sandwiched channel structure 320 forming channels 302, 303. In the second alternate embodiment, the channel structure 320 is provided separately from cover 330, and is sandwiched by the sheet 222 and the cover 330. In this embodiment, cover 300 may be similar to sheet 222 described above, and channel structure 320 may be for example a rectangle made of PVC or other plastic material, or PDMS or other polymer material, with longitudinally extending channels open on the top and bottom to define longitudinally extending holes. Channel structure 320 thus has a thickness t for example of 500 micrometers, and the holes formed by channels 302, 303 can be 900 micrometers wide and extending approximately a meter in length. At the front end, channel structure 320 can be connected so that the inlet is provided by placing a colloidal suspension supply over the holes formed by channels 302, 303, and the rear end can have an outlet structure to divide the outlet stream by connecting the holes at a certain height, for example extending in a V-shape to a rear thickness of 25 micrometers between 125 and 150 micrometers.

Figure 6:
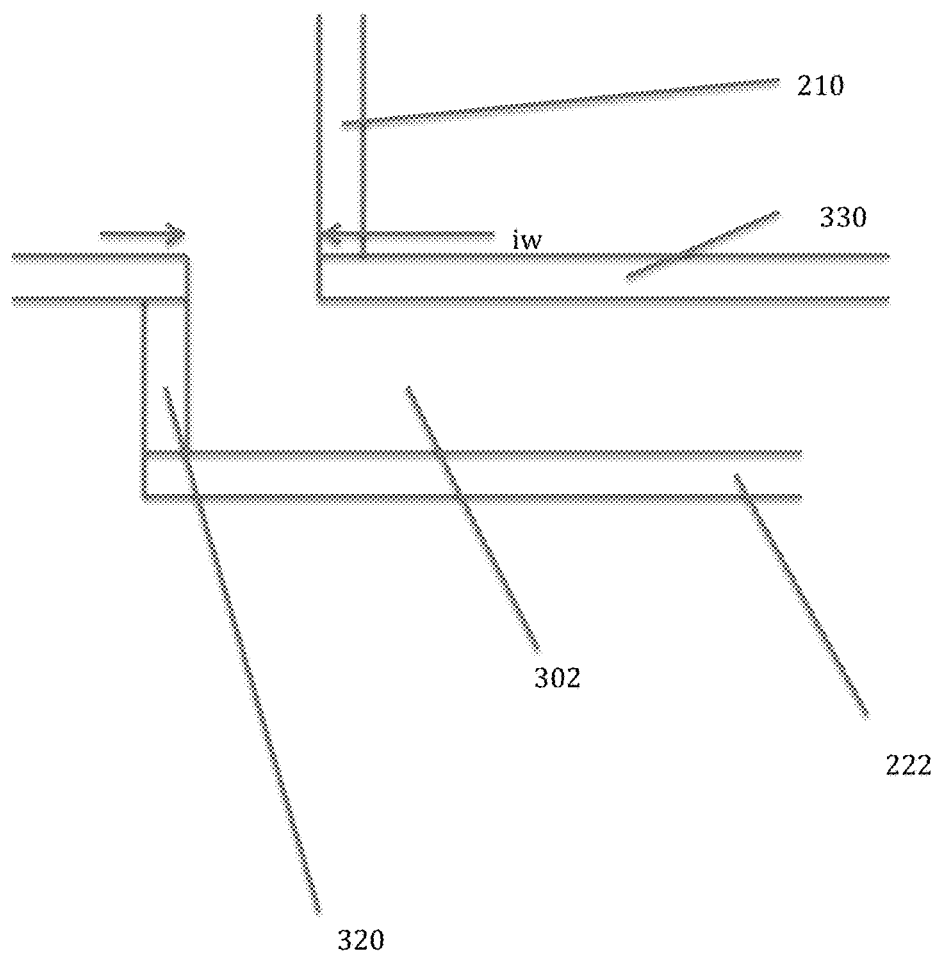
FIG. 6 shows an inlet area of the flow chamber of FIG. 5 schematically.

FIG. 6 shows an inlet area of the flow chamber of FIG. 5 schematically, with the front end of the channel structure 320 shown, and displaying how cover 330 is offset slightly to the rear with respect to sheet 222 to form the inlet distance iw for the channel structure 320. The inlet distance iw preferably is at least as large as thickness t to reduce fouling.

Figure 7:
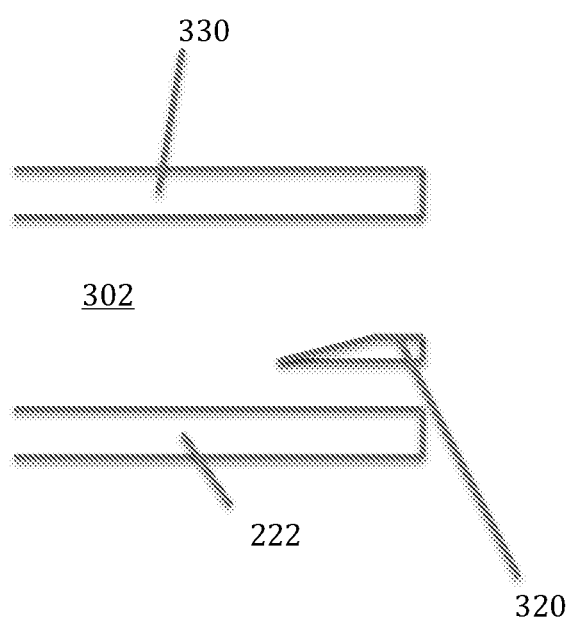
FIG. 7 shows an outlet area of the flow chamber of FIG. 5 schematically.

FIG. 7 shows an outlet area of the flow chamber of FIG. 5 schematically, with for example the rear of the channels 302, 303 (FIG. 6) of channel structure 320 being connected by a fixed splitter, for example at a height of 150 micrometers. The outlet area can be manufactured for example by micromachining or lasering the PVC material.

Figure 8:
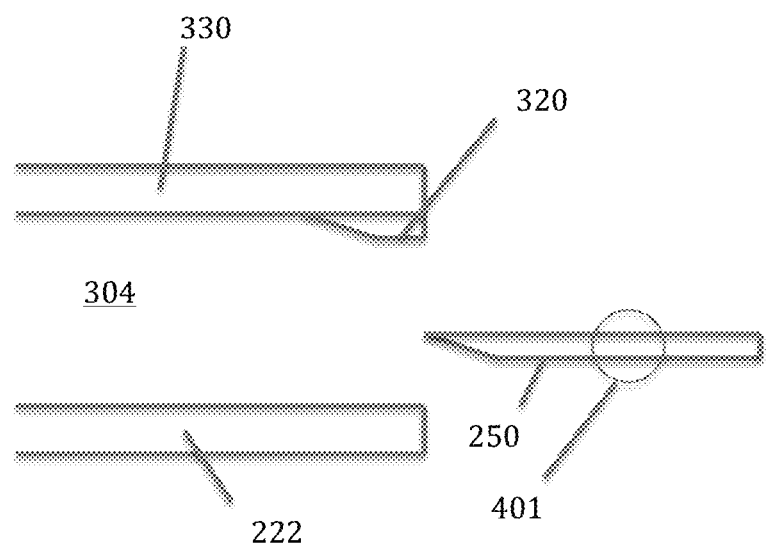
FIG. 8 shows a variable outlet splitter.

FIG. 8 shows a variable outlet splitter 250 rotatable around a shaft 401, with the rear end of channels 304 (similar to 302, 303 in FIG. 6) connected at top connector to keep the channels 304 properly spaced.

The second embodiment also may be clamped in a similar manner to the first embodiment so that the cover 330, channel structure 320 and sheet 222 are clamped to form flow chamber 212. All of the parts can be easily disassembled and cleaned, for example with clean water sprayed at high pressure.

In the two embodiments shown, on one example, the thickness of the channels is 500 micrometers, the width 900 micrometers and the length 1000 mm. Sheet 222 is approximately 1 m×1 m. An input pressure can be for example 1 mbar, or about 1 cm of input depth. Each channel can produce a flow velocity of about 0.00132457 m/s and a flow rate of 0.0357633 mL/min, and has laminar flow with a Reynolds number of about 0.85. The dwell time of the colloidal suspension in the flow chamber 212 is approximately 755 seconds. The colloidal particle diffusiophoretic velocity will vary with colloidal particle zeta potential and concentration gradients over the thickness of the flow chamber, and the exact velocity for each colloid will vary. However, colloidal particle diffusiophoretic velocities of between 1 to 10 micrometer per second are typical, as stated in the "Origins of concentration gradients for diffusiophoresis" noted above at page 4687. Thus most positively charged colloidal particles, even if at the top of the input stream at the beginning of flow chamber 212, will move, by the time the fluid has moved through the flow chamber 212 to outlet 240. A diffusiophoretic velocity of 1 micrometer per second would move colloidal particles by 755 micrometers, which is larger than the thickness of the fluid, and thus congregate the positively charged colloidal particles at the bottom of the stream at the outlet 240.

The flow rate overall for 1000 microchannels thus is 35.76 mL/min or 2.146 liters per hour, and with a slitter height of 150 micrometers, a filtered water to waste water split ratio is 70% to 30%, and a filtered water output is 1.5 liters per hour.

The embodiment channel structure described above has a minimum distance of 500 micrometers, which for most colloidal suspensions is sufficient to reduce fouling. Smaller channel thicknesses of 20 micrometers or even smaller could be possible depending on the application, but thicknesses of 100 micrometers or more are preferred. The concentration gradients and diffusiophoretic velocities at higher thicknesses may be smaller, but the laminar flow and length of the flow chamber can compensate for these effects. A thickness of 600 micrometers for example instead of 500 micrometers, with other sizes remaining the same, increases the flow rate to almost 3.9 l/h, with 2.7 liters per hour of filtered water, almost doubling output. The dwell time is 555 seconds, also leading to most positively charged colloidal particles moving via diffusiophoresis to congregate at the bottom of the stream by the time they reach outlet 240.

To maintain concentration gradients and laminar flow however, channel thicknesses of 1 mm or less are preferred, and sufficient to reduce most fouling.

The present device allows for a simply-constructed, relatively large flow rate water filtration device that can be generally free of fouling and easy to clean and maintain, all with a low energy consumption. Particles that become lodged in the channel structure can be removed during cleaning, and blockages are reduced. Thus even smaller channel structures, such as 20 micrometer thickness channel structures or smaller could be used, depending on the colloidal particles to be filtered.

The present invention also provides that the partially filtered colloidal suspension, without the positively charged colloidal particles, can pass to a negative charged colloid filter in which air is present at the bottom and carbon dioxide at the top. In this case the sheet and pressurized gas chamber can be on the top, and move the negatively charged colloidal particles downwardly through diffusiophoretic motion. This optional downstream filter can be used with or without first attempting removal of the negatively charged colloidal particles from the positively charged colloidal particle filter described in detail herein, and can be added depending on the type of colloidal suspension being filtered.

What is claimed is:

1. A diffusiophoretic water filtration device comprising:
an inlet manifold for receiving a colloidal suspension including colloidal particles in water;
a flow chamber having an inlet and an outlet, the flow chamber for receiving the colloidal suspension at the inlet from the inlet manifold and passing the colloidal suspension between the inlet and the outlet in a flow direction;
the flow chamber defined on a first side by a membrane imparting a diffusiophoretic gradient on the flow chamber; on a second side by a cover, on a third side by a first sidewall extending between the membrane and the cover; and on a fourth side by a second sidewall extending between the membrane and the cover, the first and second walls being substantially parallel; and
an outlet splitter splitting the flow chamber outlet into a first splitter outlet and a second splitter outlet, the first splitter outlet for receiving water having a higher concentration of some of the colloidal particles than the second splitter outlet,
the cover being a removable and reassemblable cover removable from the membrane to allow the flow chamber to be accessed, the membrane defining a first plane between the first and second sidewalls, the cover defining a second plane between the first and second sidewalls, and the outlet splitter defining a third plane between the first and second sidewalls, the first, second and third planes being substantially parallel.

2. The diffusiophoretic water filtration device as recited in claim 1 wherein the membrane is a PDMS sheet.

3. The diffusiophoretic water filtration device as recited in 1 wherein the inlet manifold defines a water pressure regulator.

4. The diffusiophoretic water filtration device as recited in claim 1 wherein the cover is made in one piece of PDMS together with a channel structure of longitudinally extending microchannels defining the plurality of channels, each microchannel having a thickness equal to or less than 1 mm.

5. The diffusiophoretic water filtration device as recited in claim 1 the flow chamber includes a channel structure sandwiched by the membrane and the cover.

6. The diffusiophoretic water filtration device as recited in claim 5 wherein the cover is made of PDMS and the channel structure of a plastic.

7. The diffusiophoretic water filtration device as recited in claim 1 further comprising a longitudinally extending clamp clamping the cover and with respect to the membrane.

8. The diffusiophoretic water filtration device as recited in claim 7 wherein the clamp contacts a flange on a gas chamber.

9. The diffusiophoretic water filtration device as recited in claim 5 wherein the channel structure is connected at a front end, the inlet manifold being a colloidal suspension supply over holes forms by channels in the channel structure, the cover being offset to a rear of the membrane to form an inlet distance for the channel structure.

10. The diffusiophoretic water filtration device as recited in claim 1 further providing a gas chamber providing gas to the membrane.

11. The diffusiophoretic water filtration device as recited in claim 1 wherein the flow chamber has a plurality of channels, each channel of the plurality of channels contacting the membrane.

12. The diffusiophoretic water filtration device as recited in claim 11 wherein a single outlet splitter divides each of the plurality of channels.

13. The diffusiophoretic water filtration device as recited in claim 11 wherein the channels are side-by-side channels sharing a longitudinally extending barrier of a channel structure between the cover and the membrane.

14. A diffusiophoretic water filtration device comprising:
a diffusiophoretic flow chamber having an inlet and an outlet, the flow chamber for receiving the colloidal suspension at the inlet from the inlet manifold, and passing the colloidal suspension between the inlet and at least one outlet in a flow direction; the flow chamber having side-by-side channels between the inlet and the outlet;
the side-by-side channels including a first channel bounded by a first side barrier, by a second side barrier substantially parallel to the first side barrier, by a gas permeable first membrane section extending between the first side barrier and the second side barrier, and by a gas permeable first further membrane section extending substantially parallel to the first membrane section and extending between the first side barrier and the second side barrier,
the side-by-side channels including a second channel bounded by the second side barrier, by a second channel further side barrier substantially parallel to the second side barrier, by a gas permeable second membrane section extending between the second side barrier and the further side barrier, and a gas permeable second further membrane section extending substantially parallel to the second membrane section and extending between the second side barrier and the further side barrier,
the second side barrier thus separating the first and second channels along a length of the first and second channels, the first membrane section and the second membrane section extending in a same first plane, and the first further membrane section and the second further membrane section extending in a same second plane substantially parallel to the first plane; and
an outlet splitter extending over the first and second channels to define a third plane between the first and second planes.

15. The diffusiophoretic water filtration device as recited in claim 14 wherein the flow chamber has a removable and reassemblable cover, the first and second further membrane sections being part of the cover.

16. The diffusiophoretic water filtration device as recited in claim 14 wherein the inlet manifold sits over the inlet, the inlet defined at least partially by front ends of the side-by-side channels.

17. The diffusiophoretic water filtration device as recited in claim 14 wherein the outlet splitter splits the at least one outlet of the flow chamber into a first splitter outlet and a second splitter outlet.

18. The diffusiophoretic water filtration device as recited in claim 17 wherein the outlet splitter is movable between the first and second planes.

19. The diffusiophoretic water filtration device as recited in claim 14 wherein the first membrane section and the second membrane section are part of a same membrane.

20. The diffusiophoretic water filtration device as recited in claim 19 wherein the membrane is a PDMS sheet.

21. The diffusiophoretic water filtration device as recited in claim 19 wherein the first and second further membrane sections are part of a removable and reassemblable cover.

22. The diffusiophoretic water filtration device as recited in claim 21 wherein the cover is a PDMS sheet.

23. The diffusiophoretic water filtration device as recited in claim 21 wherein the first side barrier, second side barrier and further side barriers are part of a channel structure.

24. The diffusiophoretic water filtration device as recited in claim 23 wherein the first and second further membrane sections being part of a removable and reassemblable cover, and the channel structure and the cover are made of one piece separable from the membrane.

25. The diffusiophoretic water filtration device as recited in claim 23 wherein the channel structure is separable from the cover and from the membrane.

26. The diffusiophoretic water filtration device as recited in claim 25 wherein the channel structure is made of plastic.

27. The diffusiophoretic water filtration device as recited in claim 21 further comprising clamps clamping the cover to the membrane.

28. The diffusiophoretic water filtration device as recited in claim 14 wherein the first side barrier is an edge barrier and the second side barrier is not an edge barrier, the second side barrier being wider than the first side barrier.

29. The diffusiophoretic water filtration device as recited in claim 14 wherein a width of the first channel is larger than a distance between the first membrane section and the first further membrane section.

30. The diffusiophoretic water filtration device as recited in claim 29 wherein the width is 900 micrometers and the distance 500 micrometers.

* * * * *